T. J. STURTEVANT.
MACHINE FOR REDUCING AND SEPARATING MATERIALS.
APPLICATION FILED MAY 26, 1919.

1,390,840. Patented Sept. 13, 1921.
7 SHEETS—SHEET 6.

Inventor:
Thomas J. Sturtevant
by Robt. G. Harris,
Attorney

T. J. STURTEVANT.
MACHINE FOR REDUCING AND SEPARATING MATERIALS.
APPLICATION FILED MAY 26, 1919.

1,390,840. Patented Sept. 13, 1921.
7 SHEETS—SHEET 7.

Inventor:
Thomas J. Sturtevant,
by Robt. P. Harris.
Attorney

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

MACHINE FOR REDUCING AND SEPARATING MATERIALS.

1,390,840.     Specification of Letters Patent.     Patented Sept. 13, 1921.

Application filed May 26, 1919. Serial No. 299,722.

*To all whom it may concern:*

Be it known that I, THOMAS J. STURTEVANT, a citizen of the United States, residing at Wellesley, county of Norfolk, and State of Massachusetts, have invented an Improvement in Machines for Reducing and Separating Materials, of which the following description, in connection with the accompanying drawings, is a specification, like characters on the drawings representing like parts.

The invention to be hereinafter described relates to machines for reducing and separating materials.

Heretofore, machines have been provided with a chamber containing mechanism to reduce the materials, and a separator to classify the materials reduced, the construction being such that the reducing mill may throw the reduced materials up into the separator to be graded thereby. There are certain objections to machines so constructed. Among other objections, the reducing chamber of the mill and the separating chamber are choked and obstructed to a substantial extent by the mechanism for throwing the materials upward into the separating chamber; an expensive complex mechanism is required; the internal parts of the machine are not readily accessible; and the materials are not efficiently transferred from the reducing mill to the separator.

One of the purposes of the present invention, therefore, is to combine a reducing mill with a separator and provide the same with means for introducing the materials to be separated and reduced directly into the separator through the upper end thereof, so that they may be efficiently classified by the separator.

Another purpose of the invention, is to provide means located externally of the mill and separator for transferring the materials reduced by the mill up to the separator, so as to deliver the materials into the separator through the top thereof, where they may join the materials entering the separator as aforesaid and be subjected to efficient classification by the separator.

Another purpose of the invention is to provide means to convey the coarser materials or tailings from the separator down to a centrifugal feeder serving in turn to deliver the materials to the reducing mechanism of the mill, that the materials may be further reduced and then transferred again to the separator, the construction being such that the materials continue to travel in a circuit to and from the separator and mill until they are reduced sufficiently to be delivered as fines from the separator.

Separators of machines of this type experience hard usage, and therefore, it is important that ready access may be had to the screens and other parts of the separator for purposes of inspection, repair and renewal of the internal parts thereof. Another purpose of the invention is to provide a separator with a casing having parts hinged together and screens carried by the respective parts, the construction being such that one of the casing parts may be readily swung relatively to the other to open position admitting ready access to the screens carried by both parts of the casing and ready access to other parts of the mechanism contained within the casing.

The separator mounted on the reducing mill is provided with a fan which projects the materials to be graded to a coarse or baffle screen and thence through a finer screen. The whirl of air produced by the fan causes the air currents and the materials carried thereby to strike the baffle screen tangentially. As a consequence the effective openings of the baffle screen are smaller than if the materials passed therethrough normally to the screen. Another purpose of the invention is to provide the baffle screen with elongated openings to compensate for the tangential direction of the materials aforesaid and allow proper passage of the materials therethrough. The tangential direction of the materials, however, is desirable, since more efficient baffling effect is had than if the materials met the baffle screen in a direction normal thereto, and a finer character of grading effect can be produced.

Another purpose of the invention is to provide a combined mechanical and pneumatic vibration of the screens to maintain the openings thereof in open efficient condition. The reducing mill, in the present instance of the invention, is provided with a fixed ring, and rolls within and coöperating with said ring to reduce the materials fed between them. The rolls are journaled on swing shafts which are pivotally connected to a rotary head, the construction being such that the rolls are urged outward toward the ring under the influence of centrifugal force to reduce the materials introduced between them. The pivotal connection of the roll shafts with the head allows ready movement of the rolls toward and from the ring in performing their crushing effect, and this movement produces a pounding action on the materials which sets up a vibration of the mill. This vibration in turn is transmitted to the separator mounted directly on the mill, and desirably serves mechanically to vibrate the screens of the separator and tends to maintain the meshes of said screens open for efficient classification effect.

To produce the pneumatic vibration of the screens the rotary fan in the present instance is provided with vanes of different character, the construction being such that two sets of air currents of different character are produced causing a pulsating effect on the screens which vibrates the screens and projects the materials through the screens and also dislodges clogging materials from the openings of the screens.

The mechanical vibration and the pneumatic vibration of the screens described are of different character, but the combined or mutual effect thereof produces a highly efficient vibration of the screens and keeps the openings thereof in efficient condition for classifying the materials.

Another object of the invention is to provide the separator with a double bottom, one to receive the coarser materials or tailings, and the other to receive the fines passing through the screens, and to provide rotary scrapers which coöperate with said bottoms to sweep the materials around to discharge openings for said bottoms. One of these discharge openings delivers the tailings to the reducing mill, and the other discharge opening delivers the fines from the separator.

With the aforesaid and other objects in view, the character of the invention may be best understood by reference to the following description of one good form thereof shown in the accompanying drawings, wherein:—

Figure 6:
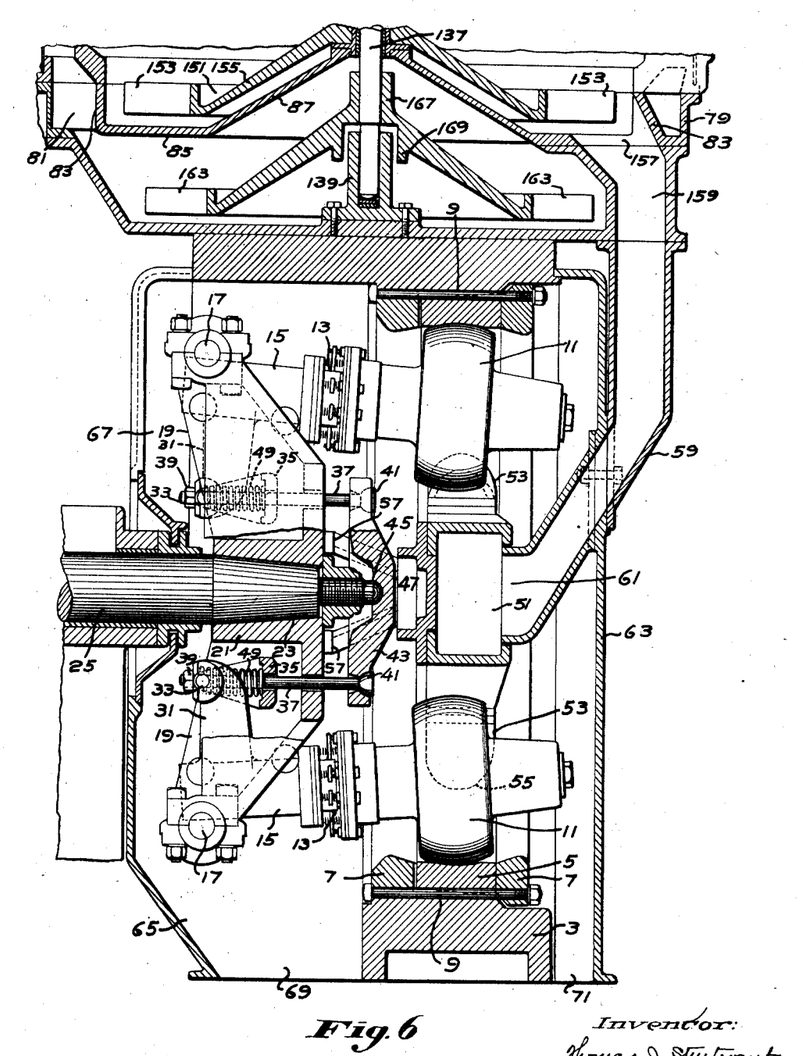
Fig. 6 is a vertical section taken on line 6—6 of Fig. 2.

Referring to the drawings, the machine shown therein as one good form of the invention, comprises a foundation of suitable construction, in the present instance of the invention, in the form of base members 1. Mounted on these base members is a heavy ring 3 (Fig. 6) having a tapered bore receiving the tapered periphery of a crusher ring 5 provided at opposite sides thereof with liner rings 7, said rings being secured in assembled relation by through bolts 9.

Coöperating with the crusher ring are crusher rolls 11 journaled on rock shafts 13 having sleeves 15 clamped thereto provided with trunnions 17 journaled in bearings in a head 19, the latter having suitably formed recesses to receive the rock shafts 13. The head 19 has a hub 21 fitted on the tapered end 23 of a main shaft 25 journaled in bearings carried by bridge frames 27 mounted on and secured to the base members 1. A large pulley 29 is mounted on the shaft 25 and adapted to be driven by a belt from any suitable source of power.

The clamping sleeves 15 of the rock shafts may be provided with inwardly projecting arms 31 in which are seated trunnions 33 of yokes 35. Projecting through a bore in the head of each yoke is a rod 37 having a nut 39 at one end thereof and a head 41 at the opposite end thereof projecting through an equalizing washer 43 having a central bearing recess 45 seated on a rounded end 47 of the head carrying shaft 25. Coil springs 49 are confined between the head of the yoke 35 and the nut 39 and tend to rock the arms 31 and shafts 13 in directions to press the rolls 11 outward toward the crusher ring 5.

To deliver the materials to be reduced to the crusher ring in front of the rolls, a centrifugal feeding device may be provided comprising a drum 51 having nozzles 53 projecting in a general radial direction from said drum and terminating in curved delivery mouths 55. The drum may be mounted on and rotate with the head 19. To accomplish this, the drum is connected to said head by a spider 57. To conduct the materials to be reduced to the head 51, a chute 59 may be provided having a mouth 61 communicating with an opening in the drum, said chute being mounted on a door 63 of the casing which may be hinged thereto, the construction being such that when the door is opened, the chute will swing with it away from the drum. The chute projects upwardly toward the top of the casing and is adapted to receive tailings from the separator, as more fully hereinafter described.

To inclose the roll carrying head and parts of the rock shafts for the rolls, a suitable casing may be provided, in the present instance, comprising a lower casing 65 mounted on the base members 1 referred to, and projecting upward to the axis of the main shaft 25. Above the lower casing is an upper casing in the form of a pair of hollow doors 67 of segmental form.

Materials to be reduced may be conducted by the chute 59 to the centrifugal feeding device and be conducted by the nozzles thereof to the ring in front of the rolls. The rolls under the influence of centrifugal force and with the assistance of the coil springs 49 if desired are pressed outward toward the crusher ring to reduce the materials introduced between them. The materials thus acted upon may flow laterally from the crusher ring and issue from the mill through discharge openings 69 and 71 (Fig. 6) at opposite sides of the ring.

The ring-roll mill described above may be substantially the same in construction and operation as the ring-roll mill shown, described and claimed in my copending application Serial No. 293,906, filed May 1, 1919, and therefore, further elucidation of the construction and operation thereof is unnecessary herein.

Figures 1, 2:
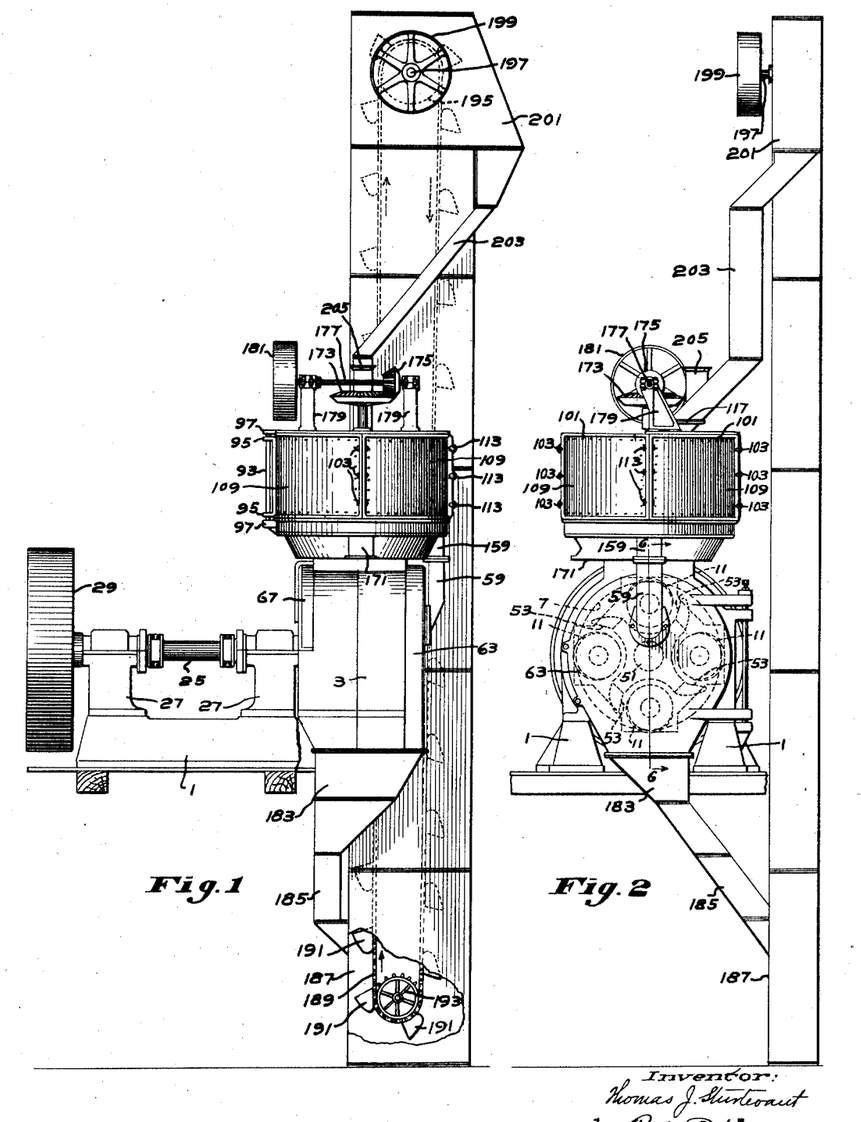
Figure 1 is a front elevation of the machine shown herein as one good form of the invention.
Fig. 2 is a side elevation of the machine shown in Fig. 1.
Figure 4:
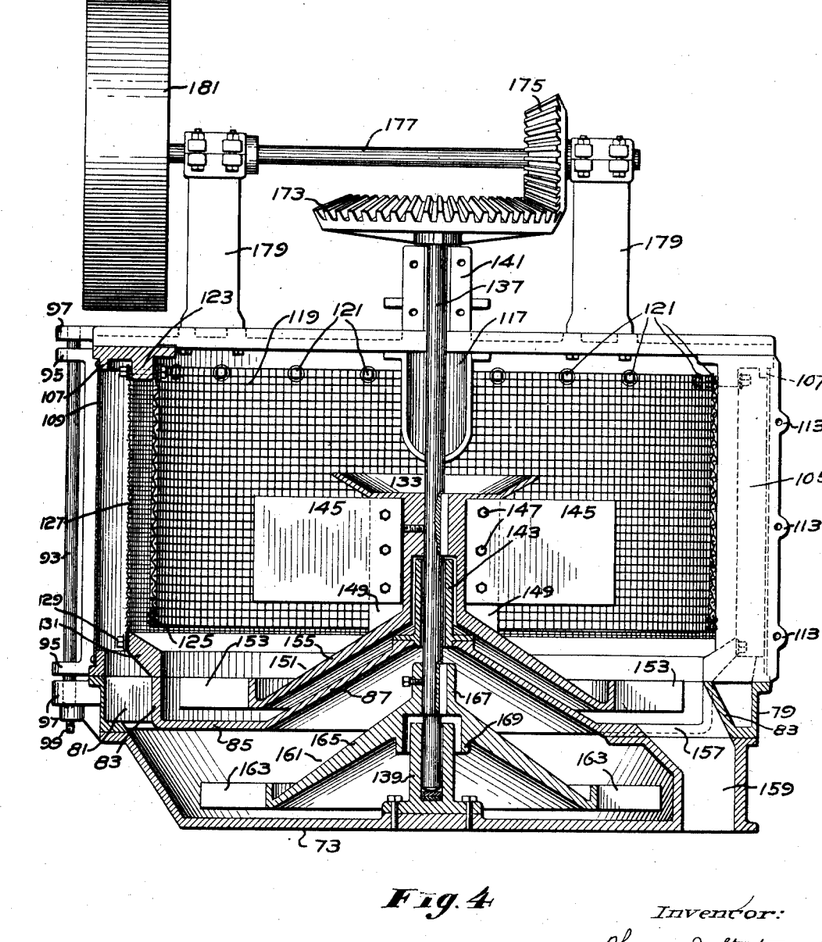
Fig. 4 is a vertical section through the separator taken on line 4—4 of Fig. 3.
Figure 5:
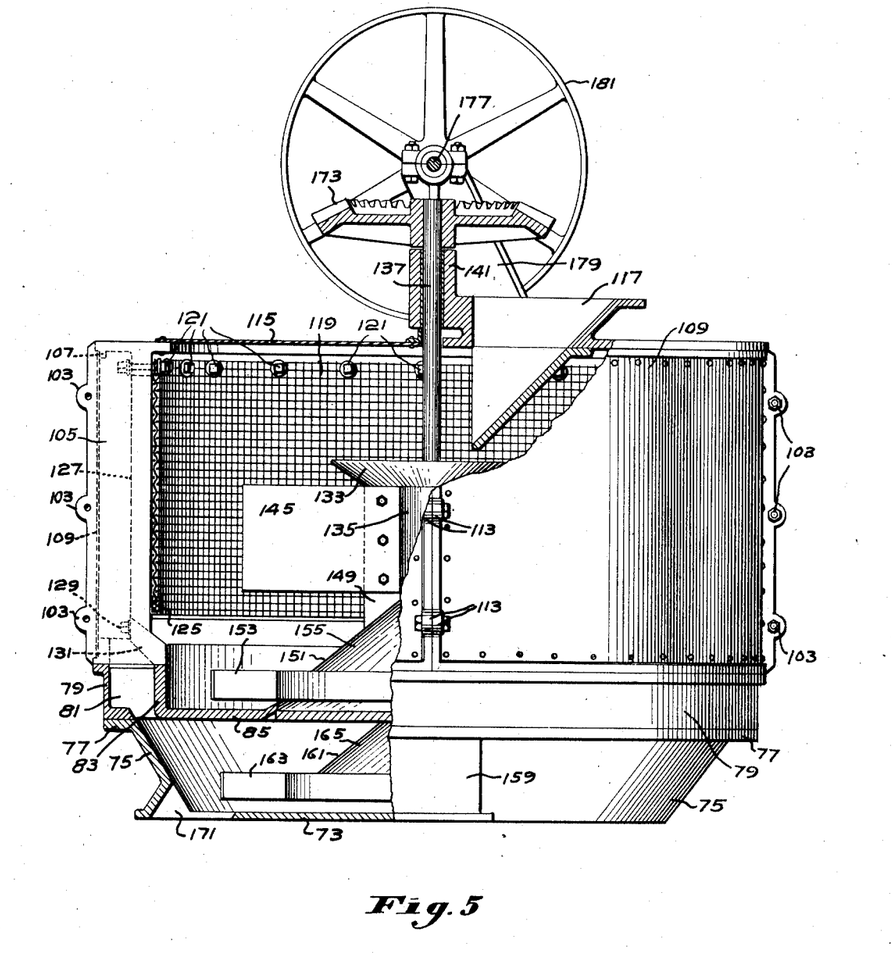
Fig. 5 is a vertical section through the separator taken on line 5—5 of Fig. 2, a part of the casing being shown in side elevation.

Having described the reducing mill, the separator for classifying materials will be next described. This separator, in the present instance of the invention, comprises a lower bottom 73 (Figs. 4 and 5) which may be mounted directly on and secured to the heavy ring 3 referred to, of the ring-roll mill, as will be noted in Figs. 1 and 6. The ring 3 is preferably provided at the upper portion thereof with a relatively large, flat flange or plate 73ª, upon which the separator frame is mounted. Rising from the lower bottom 73 is a tapered wall 75 having an outwardly projecting flange 77 supporting a ring 79 connected by inwardly projecting brackets 81 with a wall 83 rising from the upper bottom 85. The latter has a conical central portion 87.

Figure 3:
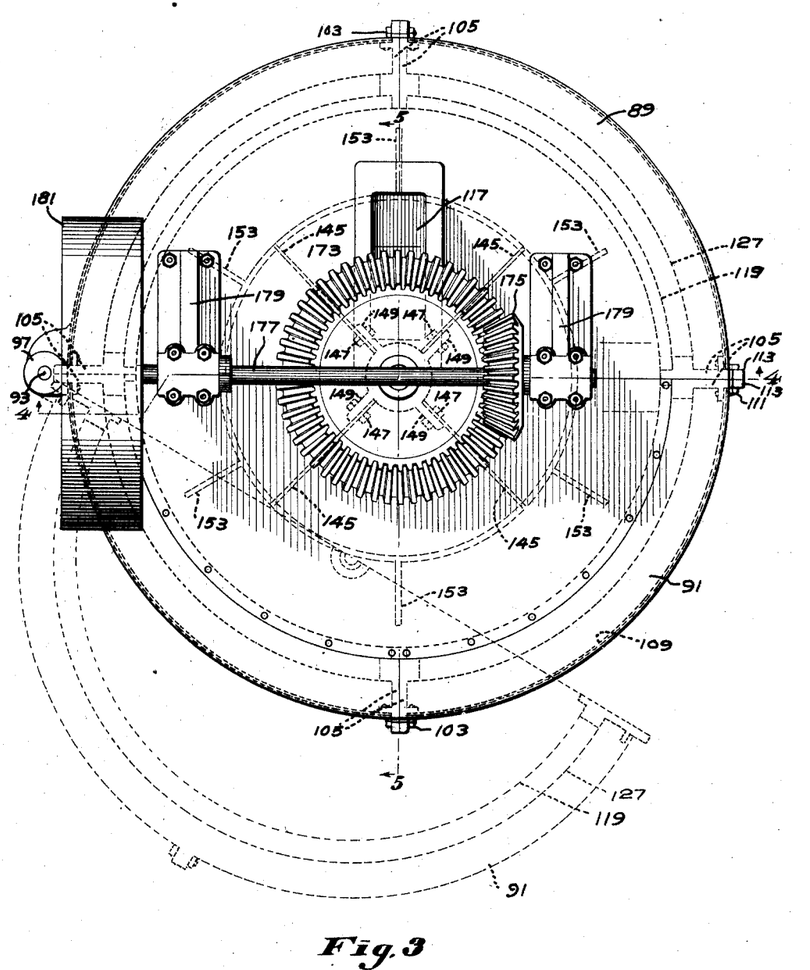
Fig. 3 is a plan of the separator.

Mounted on the ring 79 is a cylindrical casing comprising two parts 89 and 91 connected by suitable hinge means, in the present instance, in the form of an upright shaft 93 (Figs. 3 and 4) projecting through and secured to ears 97 on the casing part 91, and projecting through ears 95 on the casing part 89. The lower end of the hinge shaft 93 may rest on an adjusting screw 99, the construction being such that on adjustment of said screw, the hinge shaft 93 may be raised or lowered to position the casing part 91 at the proper elevation to permit free swinging thereof to open and closed positions.

The casing parts 89 and 91 may be of any appropriate construction for the purposes. In the present instance of the invention, each of said parts comprises a pair of four-sided frames 101 having their inner sides secured together by bolts 103. At the ends of the frames 101 are inwardly projecting flanges 105 adapted for engagement to contribute to the stiffness and strength of the construction. Each of the frames has a lip 107 projecting inwardly therefrom, to which is secured a curved plate 109. The ends of the casing parts opposite the hinge therefor may be detachably secured together by bolts 111 entered through registering ears 113 projecting outward from the frames 101.

Mounted on the upper sides of the frames 101 is a head 115 supporting a hopper 117 for admitting materials into the separator.

A baffle or scalper screen 119, in the present instance, of cylindrical form, is mounted within the casing, and has its upper edge secured by bolts 121 to flanges 123 depending from the upper sides of the frames 101. The screen depends from said flange, and the lower edge of the screen is provided with a stiffening ring 125.

Between the baffle or scalper screen and the curved walls of the casing is a finer screen 127 having its upper edge secured by the bolts 121 referred to, to the flange 123, and having its lower edge secured by screw bolts 129 to a ring 131 registering with the wall 83 referred to, rising from the upper bottom 85.

These screens experience hard usage, and therefore, it is desirable that ready access may be had thereto from time to time for the purpose of inspection, repair or replacement thereof. Therefore, these screens may each be made in sections which are mounted on and secured to the casing parts 89 and 91. The construction is such that when the casing part 91 is swung to its open position indicated in dotted lines in Fig. 3, ready access may be had to the screens carried by both parts of the casing.

Suitable means may be provided to project the materials to be graded from the hopper 117 to the screens. This means, in the present instance of the invention, comprises a distributer, conveniently in the form of a dish 133 (Figs. 4 and 5) having a hub 135 fast on an upright shaft 137 having its lower end journaled in an end thrust bearing 139 mounted on and secured to the lower bottom 73 referred to. The upper end of said shaft is journaled in a bearing 141 mounted on the head of the casing, and an intermediate portion of the shaft passes through a sleeve 143 mounted on the conical portion 87 of the upper bottom 85.

The fan for projecting the materials to the screens, in the present instance of the invention, comprises vanes 145 detachably secured by bolts 147 with ribs 149 projecting from and conveniently integral with the hub 135 referred to, of the distributer dish.

The construction described is such that materials flowing downward through the hopper 117 will be directed to and fall upon the distributer dish 133, and the air currents produced by the fan will project the materials toward the scalper screen. The coarser materials on striking said screen will be baffled thereby and fall downward within said screen to the upper bottom 85. Finer materials will pass through the scalper screen and strike the finer screen 127 and fall through the annular space between said screens down to the upper bottom 85. Still finer materials pass through the finer screen 127 and fall down through the annular space between said finer screen and the outer wall of the casing through the annular space between the ring 79 and the wall 83 and thence to the lower bottom 73.

Suitable means may be provided to deliver the materials from the upper bottom and from the lower bottom. To accomplish this, in the present instance of the invention, a rotary scraper 151 (Figs. 4 and 5) may be provided comprising a series of blades 153 projecting from a conical web 155 depending from and conveniently integral with the hub referred to, for the distributer dish and fan. The upper bottom 85 has a discharge port 157 (Fig. 4) communicating with a discharge passage 159, as will be noted in Fig. 4. The construction is such that the coarse material or tailings falling downward toward the upper bottom 85 will strike the conical web 155 of the scraper and be deflected outward to the blades 153. The latter in the course of their rotation will sweep the materials around the bottom 85 to the discharge port 157 and thereby positively discharge the materials from the bottom through the port 157 and the passage 159.

To discharge the finer particles falling onto the lower bottom 73, a similar scraper 161 may be provided comprising blades 163 projecting from a conical web 165 having a hub 167 secured to the upright shaft 137. A hood 169 may project downward from said hub over the end thrust bearing 139 referred to, to prevent entrance of materials into said bearing.

The lower bottom 73 may be provided with a discharge port 171 (Fig. 5) which may be connected to a chute for conducting the fines to any point desired.

The fines passing through the screen 127 will fall down to the lower bottom 73 and be deflected outward by the conical portion 165 of the scraper 161 to the blades 163. The latter in the course of their rotation will sweep the fines around the lower bottom and positively discharge the same through the port 171.

Suitable means may be provided for driving the upright shaft 137. This means, in the present instance, comprises a bevel gear 173 meshing with and driven by a bevel pinion 175 fast on a horizontal shaft 177 journaled in bearings in uprights 179 mounted on the casing part 89 referred to. At one end of the horizontal shaft 177 is a pulley 181 which may be driven by a belt (not shown) from any suitable source of power.

It will be noted that the hopper 117, the bearing 141 for the upright shaft, and the driving mechanism for said shaft are all mounted on the stationary part 89 of the casing. As a consequence, the other casing part 91 may readily swing to open and closed positions without disturbing the hopper and the driving mechanism for the upright shaft.

The discharge passage 159 referred to, for delivering the tailings from the separator, projects to the horizontal plane of the lower face of the lower bottom 73 referred to, and is so located that it will register and communicate with the chute 59 referred to, for conducting materials to the centrifugal feeder of the reducing mill. As a consequence, the tailings from the separator will be conducted through the chute 59 to the centrifugal feeder and will be directed by the nozzles of the latter to the crusher ring 5 in front of the crusher rolls 11, and will be reduced thereby.

It is desirable that the materials reduced by the mill shall be conducted to the separator to be graded thereby. To accomplish this, in the present instance of the invention, a hopper 183 (Figs. 1 and 2) is connected to the lower end of the casing for the reducing mill, and a spout 185 is connected to the lower end of the hopper 183 and to the casing 187 of an elevator comprising an endless belt conveniently in the form of a sprocket chain 189 carrying buckets 191 and guided by a lower sprocket wheel 193 and an upper sprocket wheel 195, the latter being mounted on a shaft 197 projecting outward from the casing 187 and provided with a pulley 199 adapted to receive a belt (not shown) driven from any suitable source of power. The top of the casing 187 is in the form of a hood 201 having a portion projecting laterally beyond the body of the casing and communicating with a spout 203 having its lower end connected to the hopper 117 referred to, of the separator. Also communicating with the hopper 117 is a supply spout 205 (Figs. 1 and 2) which may receive the materials to be separated and reduced from any source of supply.

In operation, the materials will enter the supply spout 205 and pass thence downward through the hopper 117 to the rotary distributer dish 133. They will be thrown outward therefrom under the influence of centrifugal force and be subjected to the air currents produced by the fan, and will be projected by the latter to the screens and be classified as described. The fines will be discharged through the port 171 while the tailings are discharged through the passage 159 to the chute 59 and returned thereby to the reducing mill to be reduced thereby. The materials will pass from the mill through the hopper 183 and spout 185 toward the bottom of the elevator casing where they will be caught by the elevator buckets 191 and will be elevated thereby to the hood of the casing and discharged thence through the spout 203 back to the separator to experience further classification. The materials will continue to pass from the separator through the reducing mill and through the elevator until they are sufficiently fine to issue from the screen 127.

The crusher rolls in the work of reducing materials will move toward and from the crusher ring and produce a pounding effect which will set up a vibration of the mill which will be transmitted directly from the crusher ring and heavy ring to the bottom of the separator. The vibration will be transmitted thence to the screens and clear the same and maintain the meshes thereof in open condition for efficient grading effect.

Figure 7:
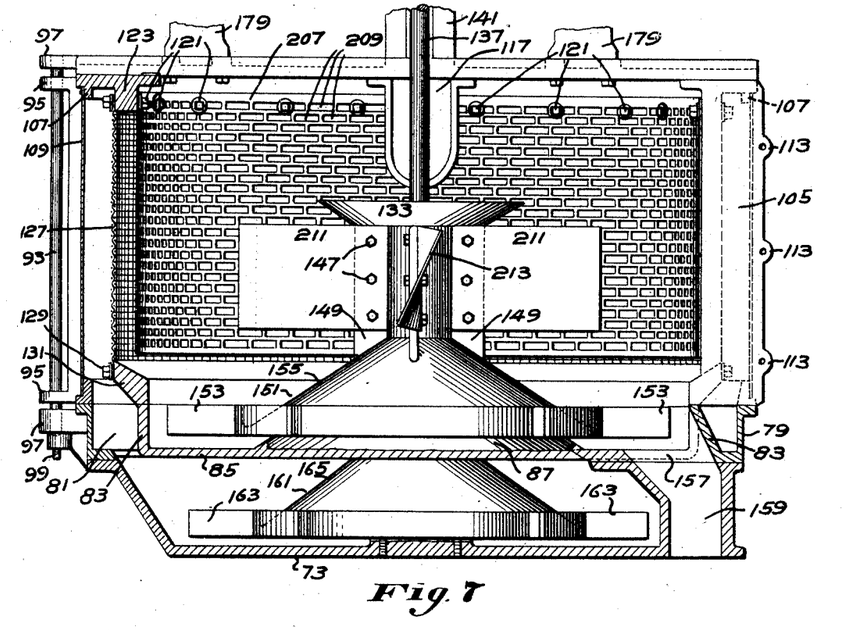
Fig. 7 is a vertical section through a modified form of separator.
Figure 8:
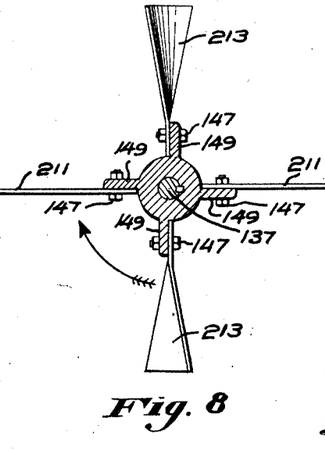
Fig. 8 is a sectional detail of the fan shown in Fig. 7.
Figure 9:
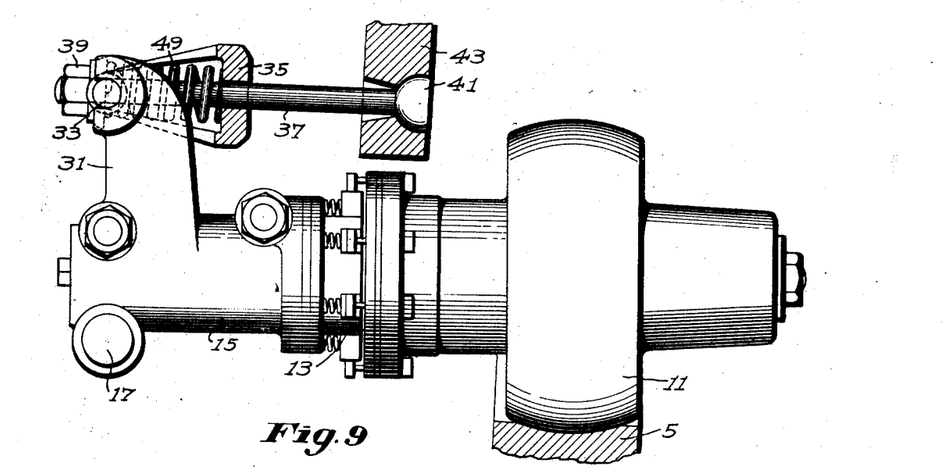
Fig. 9 on an enlarged scale is a view of one of the crushing rolls and supporting means therefor, certain parts being shown in section.
Figure 10:
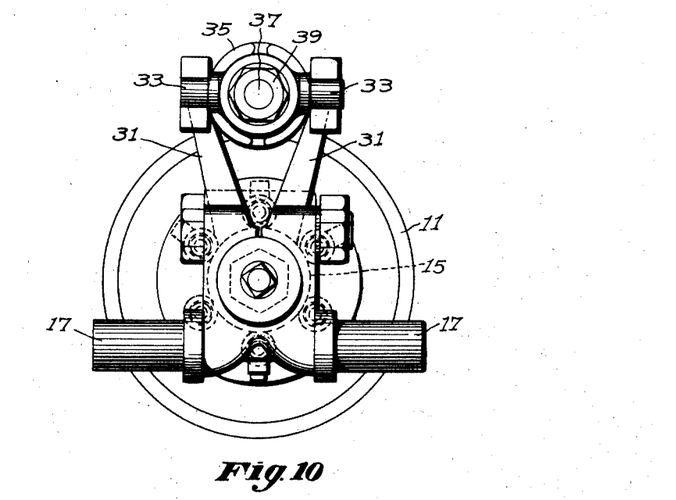
Fig. 10 is a view looking toward the right of Fig. 9.

Referring now more particularly to Figs. 7 and 8, a separator is shown therein which is similar to the separator already described, with the exception of the construction of the baffle screen and the fan.

This baffle screen, in the present instance of the invention, is in the form of a metal plate 207 containing elongated openings 209. As stated, the whirl of the air currents carrying the materials is such that the latter will strike the baffle screen tangentially, and the effective openings in the screen are less than if the materials met the screen in a direction normal thereto. By these elongated openings, however, the materials may readily pass therethrough, but with the desirable baffling effect obtained by the tangial direction of the air currents and materials.

The mechanical vibration of the screens produced by the natural vibrations of the reducing mill has already been described. As stated, this mechanical vibration may be assisted by the pneumatic action of the fan on the screens. To accomplish this, in the present instance of the invention, a fan is provided having vertical vanes 211 and angular vanes 213 alternating therewith. The number of these vanes may be varied as desired, and while in the present instance the vertical vanes and the angular vanes form a part of the same fan, it will be understood that in some instances the vertical vanes may be on one fan and the angular vanes may be on another fan adjacent thereto.

In operation, the flat vertical vanes 211 will produce an air current which is forced directly outward toward the screens, whereas, the angular vanes 213 produce an air current which is forced upward in the general direction of the axis of the fan. Thereupon it meets the top of the casing and is deflected downward and outward in a curved path toward the screens. The different character of these two air currents produces air pulsations on the screens of varying force, and as a consequence, they tend to vibrate said screens, and keep the meshes thereof in clear and open condition for efficient grading effect.

The mechanical vibration of the screens produced by the natural vibration of the reducing mill and the pneumatic vibration of the screens produced by the fan combine and mutually result in maintaining the openings of the screens free and unobstructed for efficient classification effect.

By my invention is provided a machine which is strong, simple and compact in construction; all the internal parts thereof are readily accessible for inspection, repair or replacement thereof; and the materials are efficiently graded and reduced thereby.

It will be understood that the invention is not limited to the specific embodiment shown, but that various deviations may be made therefrom without departing from the spirit and scope of the appended claims.

What is claimed is:—

1. A machine of the character described, comprising, in combination, a separator provided with a casing having parts hinged together on a vertical axis, a screen within said casing formed in sections and having the sections carried by said parts that access may be had to the screen sections and interior of the separator by swinging part of the casing outward, a cover for the separator formed in sections and carried by the casing parts, a vertical shaft having a bearing mounted on one of said casing parts, and a rotary fan secured to said shaft for producing air currents to project materials to be graded through said screen.

2. A machine of the character described, comprising, in combination, a separator provided with a casing having parts hinged together on a vertical axis, a screen mounted in said casing comprising sections suspended from the upper portions of said casing parts that access may be had to the screen and interior of the separator by swinging part of the casing outward, a vertical shaft having a bearing mounted on one of said casing parts, and a rotary fan secured to the shaft for producing air currents to project materials to be graded through said screen.

3. A machine of the character described, comprising, in combination, a separator provided with a cylindrical casing having a fixed part and a movable part hinged thereto on a vertical axis, a screen within said casing formed in sections and having a section carried by each of said parts that access may be readily had to the sections by swinging part of the casing outward, a vertical shaft having a bearing carried by said fixed parts, and a rotary fan secured to said shaft for producing air currents to project materials to be graded through said screen.

4. A machine of the character described, comprising, in combination, a separator casing, a cylindrical screen mounted therein, and a rotary fan mounted in said separator casing and having alternate vanes of different character, one set of vanes constructed to propel the air outward in direct contact with the screen and the other set of vanes constructed to propel the air angularly against the screen to produce pulsating air currents for pneumatically vibrating the screen.

5. A machine of the character described, comprising, in combination, a separator, a baffle-screen therein, a fan rotated within the separator for directing air currents against the screen, said fan having the alternate vanes thereof of different character and differently inclined to produce air currents directed successively at different angles against the screen to pneumatically vibrate the screen.

6. A machine of the character described, comprising, in combination, a separator having a shaft rotatably mounted therein, a baffle screen within the separator, and a fan rotated within the screen by said shaft to direct air currents against the screen, said fan having the alternate vanes thereof of different character to vary the force and direction of the air currents directed against the screen and thereby pneumatically vibrate the screen.

7. A machine of the character described, comprising, in combination, a separator having a shaft rotatably mounted therein, a baffle screen within the separator, a dish rotated within the screen by said shaft and operable to throw the material to be graded outward toward the screen, and a fan rotated within said screen to produce air current for propelling the material tangentially against the screen.

8. A machine of the character described, comprising, in combination, a casing, a baffle screen mounted therein having elongated openings therein, a dish rotatably mounted within the screen to throw the material to be graded outward toward the screen, and a rotary fan for directing air currents tangentially to said screen in the general direction of the longer dimension of said openings.

9. A machine of the character described, comprising, in combination, a separator provided with a casing having parts hinged together on a vertical axis, a screen within said casing completely encircling the interior of the separator, said screen formed in sections and having the sections carried by said parts and movable therewith about the hinged connection, and a fan rotatable within said screen to produce air currents to project materials to be graded through the screen.

10. A machine of the character described, comprising, in combination, a casing, a heavy ring located in a vertical plane within the casing, a rotary carrier, rolls on said carrier coöperating with the inner surface of the ring to crush materials introduced between the rolls and ring and operable to vibrate the ring energetically, a heavy plate-like flange upon the top of said ring, a screen supporting plate seated upon said flange, a rotary fan, a screen supported by said plate to surround said fan and adapted to have materials forced against it by the fan, means for delivering materials to be graded to the fan and for conducting the coarser materials from the screen to the crushing ring, said plate-like flange adapted to transmit the energetic vibrations of the ring directly to said plate and screen to vibrate the screen and keep its meshes in open condition for effective grading effect.

In testimony whereof, I have signed my name to this specification.

THOMAS J. STURTEVANT.